United States Patent
Deshpande et al.

(10) Patent No.: US 10,207,881 B2
(45) Date of Patent: Feb. 19, 2019

(54) TELESCOPING RAMP

(71) Applicant: HORIZON GLOBAL AMERICAS INC., Plymouth, MI (US)

(72) Inventors: Dhananjay B. Deshpande, Twinsburg, OH (US); Matthew Romanak, Garfield Heights, OH (US); Shrikant A. Pomendkar, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 15/799,102

(22) Filed: Oct. 31, 2017

(65) Prior Publication Data

US 2018/0118477 A1    May 3, 2018

Related U.S. Application Data

(60) Provisional application No. 62/414,946, filed on Oct. 31, 2016.

(51) Int. Cl.
 *B65G 69/28* (2006.01)
 *B65G 69/30* (2006.01)

(52) U.S. Cl.
 CPC ......... *B65G 69/2876* (2013.01); *B65G 69/30* (2013.01)

(58) Field of Classification Search
 CPC .. B65G 69/2876; B65G 69/30; B63B 27/143; B63B 2027/141; E01D 15/124; E01D 18/00
 See application file for complete search history.

(56) References Cited

U.S. PATENT DOCUMENTS

| 426,209 | A | | 4/1890 | McIntyre |
| 963,918 | A | | 7/1910 | Miller |
| 1,194,819 | A | | 8/1916 | Clark |
| 1,201,790 | A | * | 10/1916 | Allen ..................... B65G 69/30 193/41 |

(Continued)

FOREIGN PATENT DOCUMENTS

| CN | 202194553 | 4/2012 |
| DE | 370353 C | 3/1923 |

(Continued)

OTHER PUBLICATIONS

International Searching Authority/EP Int'l Search/Written Opinion, PCT/US17/059259, dated Feb. 15, 2018.
Parts and Accessories Catalog, May 26, 1988, p. 223.

*Primary Examiner* — Abigail A Risic
(74) *Attorney, Agent, or Firm* — McDonald Hopkins LLC

(57) ABSTRACT

A telescoping ramp may include first and second ramp sections such that the second ramp section may be received within the first ramp section and translated between an extended position and a retracted position. The telescoping ramp may include a locking mechanism that extends between at least one of pairs of rails of the first and second ramp sections. The locking mechanism may include a pair of locking pins that is selectively engageable with the first and second ramp sections. In one embodiment, the pair of locking pins may include handle portions that may be disposed between the at least one of the pairs of rails. In such embodiment, an axial movement of the handle portions along a common axis of the pair of locking pins may lock the second ramp section relative to the first ramp section.

21 Claims, 6 Drawing Sheets

(56) References Cited

U.S. PATENT DOCUMENTS

| | | | |
|---|---|---|---|
| 1,232,437 A | 7/1917 | Simpson | |
| 1,293,083 A * | 2/1919 | Golding | B65G 69/30 193/41 |
| 1,504,744 A | 8/1924 | Cox | |
| 1,568,303 A | 1/1926 | Webster | |
| 1,626,597 A | 5/1927 | Cantor | |
| 1,635,462 A | 7/1927 | Cummings | |
| 1,659,928 A | 2/1928 | Townsend | |
| 2,122,301 A | 12/1938 | Soss | |
| 2,141,529 A | 12/1938 | Gravelle | |
| 2,615,544 A * | 10/1952 | Rynders | B65G 69/30 193/38 |
| 2,779,489 A | 1/1957 | Boom | |
| 3,339,968 A | 11/1967 | Hall | |
| 3,352,440 A | 11/1967 | Wilson | |
| 3,423,780 A | 1/1969 | Alten | |
| 3,510,015 A | 5/1970 | Roshaven | |
| 3,517,772 A | 6/1970 | Weis | |
| 3,532,058 A | 10/1970 | van der Meide | |
| 3,580,373 A | 5/1971 | Stickle | |
| 3,613,920 A | 10/1971 | Flamm | |
| 3,642,156 A | 2/1972 | Stenson | |
| 3,713,553 A | 1/1973 | Curtis | |
| 3,735,454 A | 6/1973 | Goldstein | |
| 3,737,058 A | 6/1973 | Johnson | |
| 3,818,528 A | 6/1974 | Petersen | |
| 3,977,545 A | 8/1976 | Lloyd | |
| 3,984,891 A | 10/1976 | Weinmann | |
| 4,047,701 A | 9/1977 | Glaesener | |
| 4,098,414 A | 7/1978 | Abiera | |
| 4,127,201 A | 11/1978 | Baumann | |
| 4,182,431 A | 1/1980 | Wing | |
| 4,186,901 A | 2/1980 | Shorey | |
| 4,443,905 A | 4/1984 | Kopp | |
| 4,478,549 A | 10/1984 | Stelly | |
| 4,528,711 A | 7/1985 | Packer | |
| 4,668,002 A | 5/1987 | Hanson | |
| 4,722,109 A | 2/1988 | Mountz | |
| 4,726,155 A | 2/1988 | Nahmias | |
| 4,727,612 A | 3/1988 | Smith | |
| 4,735,454 A | 4/1988 | Bernard | |
| 4,761,847 A | 8/1988 | Savage | |
| 4,779,298 A | 10/1988 | Nichols | |
| 4,853,999 A | 8/1989 | Smith | |
| 4,864,672 A | 9/1989 | Altieri | |
| 4,874,284 A | 10/1989 | New | |
| 4,878,800 A | 11/1989 | Dell | |
| 4,995,129 A | 2/1991 | Comardo | |
| 5,077,852 A * | 1/1992 | Karlsson | B65G 69/287 14/69.5 |
| 5,096,362 A | 3/1992 | Best | |
| 5,133,584 A | 7/1992 | McCleary | |
| 5,133,634 A | 7/1992 | Gingrich | |
| 5,156,432 A | 7/1992 | McCleary | |
| 5,137,114 A * | 8/1992 | Yde | E04F 11/002 14/71.1 |
| 5,169,202 A | 12/1992 | Cupp | |
| 5,211,437 A | 5/1993 | Gerulf | |
| 5,213,458 A | 5/1993 | Preller | |
| 5,244,335 A * | 9/1993 | Johns | B60P 1/435 296/61 |
| 5,273,335 A | 12/1993 | Belnap | |
| 5,287,579 A | 2/1994 | Estevez | |
| 5,325,558 A | 7/1994 | Labreche | |
| D353,701 S | 12/1994 | Beavers | |
| 5,438,308 A | 8/1995 | Leupold | |
| 5,440,773 A | 8/1995 | Lentini | |
| 5,481,773 A | 1/1996 | Alten | |
| 5,538,308 A | 7/1996 | Floe | |
| 5,553,989 A | 9/1996 | Ullman | |
| 5,560,063 A | 10/1996 | Alten | |
| 5,608,937 A | 3/1997 | Seigneur | |
| 5,640,733 A | 6/1997 | Alten | |
| 5,768,733 A | 6/1998 | Kneebone | |
| D398,129 S | 9/1998 | Sacks | |
| 5,803,523 A * | 9/1998 | Clark | B60P 1/435 14/71.1 |
| 5,853,281 A | 12/1998 | Farmer | |
| 5,870,788 A | 2/1999 | Witkin | |
| 5,926,889 A | 7/1999 | Riesselmann | |
| 5,933,898 A | 8/1999 | Estes | |
| 5,988,725 A | 11/1999 | Cole | |
| 6,009,587 A | 1/2000 | Beeman | |
| 6,139,249 A | 10/2000 | Lucht | |
| 6,227,593 B1 | 5/2001 | DeValcourt | |
| 6,345,950 B1 * | 2/2002 | Gerwitz | B65G 11/143 14/71.1 |
| 6,715,177 B1 | 4/2004 | Lagergren-Julander | |
| 6,722,721 B2 | 4/2004 | Sheffer | |
| 6,746,068 B1 | 6/2004 | Hurd | |
| 6,811,067 B2 | 11/2004 | Muizelaar | |
| 6,842,930 B2 | 1/2005 | Massey | |
| 7,100,231 B2 | 9/2006 | Peschmann | |
| 7,179,042 B1 | 2/2007 | Hartmann | |
| 7,237,294 B2 * | 7/2007 | Lensing | B65G 69/30 14/69.5 |
| 7,284,781 B2 * | 10/2007 | Grant | B60P 1/435 296/57.1 |
| 7,478,449 B2 * | 1/2009 | Williams | B65G 69/30 14/69.5 |
| 7,488,025 B1 | 2/2009 | Roberson | |
| 7,524,156 B2 | 4/2009 | Garbes | |
| 7,926,139 B2 | 4/2011 | Metcalfe | |
| 8,707,495 B2 | 4/2014 | Romanak | |
| 9,745,153 B2 * | 8/2017 | Pelzer | B65G 69/30 |
| 2001/0031193 A1 | 10/2001 | Chevrier | |
| 2001/0039687 A1 | 11/2001 | Hahn | |
| 2002/0070079 A1 | 6/2002 | Rosenwinkel | |
| 2002/0124332 A1 | 9/2002 | Janowak | |
| 2003/0053900 A1 | 3/2003 | Neville | |
| 2003/0229953 A1 | 12/2003 | Treadway | |
| 2004/0083562 A1 | 5/2004 | Leblanc | |
| 2006/0010621 A1 | 1/2006 | Wentz | |
| 2006/0177294 A1 | 8/2006 | Garbes | |
| 2006/0200919 A1 | 9/2006 | Frahm | |
| 2007/0160450 A1 | 7/2007 | Ehler | |
| 2007/0199166 A1 | 8/2007 | Peschmann | |
| 2008/0060146 A1 | 3/2008 | Han | |
| 2008/0263790 A1 * | 10/2008 | Hoffman | B65G 69/30 14/71.1 |
| 2008/0263791 A1 | 10/2008 | Roberts | |
| 2008/0313825 A1 | 12/2008 | Murakoshi | |
| 2008/0319621 A1 | 12/2008 | Xiang | |
| 2009/0020305 A1 | 1/2009 | Fidler | |
| 2009/0108614 A1 * | 4/2009 | Washington | B60P 1/435 296/61 |
| 2009/0183321 A1 | 7/2009 | Boresi | |
| 2011/0252582 A1 | 10/2011 | Metcalfe | |
| 2013/0043093 A1 | 2/2013 | Smith | |
| 2016/0159587 A1 * | 6/2016 | Stone | B65G 69/2876 14/71.1 |
| 2016/0297343 A1 * | 10/2016 | Pelzer | B65G 69/30 |

FOREIGN PATENT DOCUMENTS

| | | |
|---|---|---|
| DE | 2106972 A1 | 8/1972 |
| DE | 4234592 A1 | 9/1993 |
| EP | 2322752 | 5/2011 |
| GB | 499208 A | 1/1939 |
| GB | 1038445 A | 8/1966 |
| WO | WO1989006199 A1 | 7/1989 |
| WO | WO1994005878 A1 | 3/1994 |

* cited by examiner

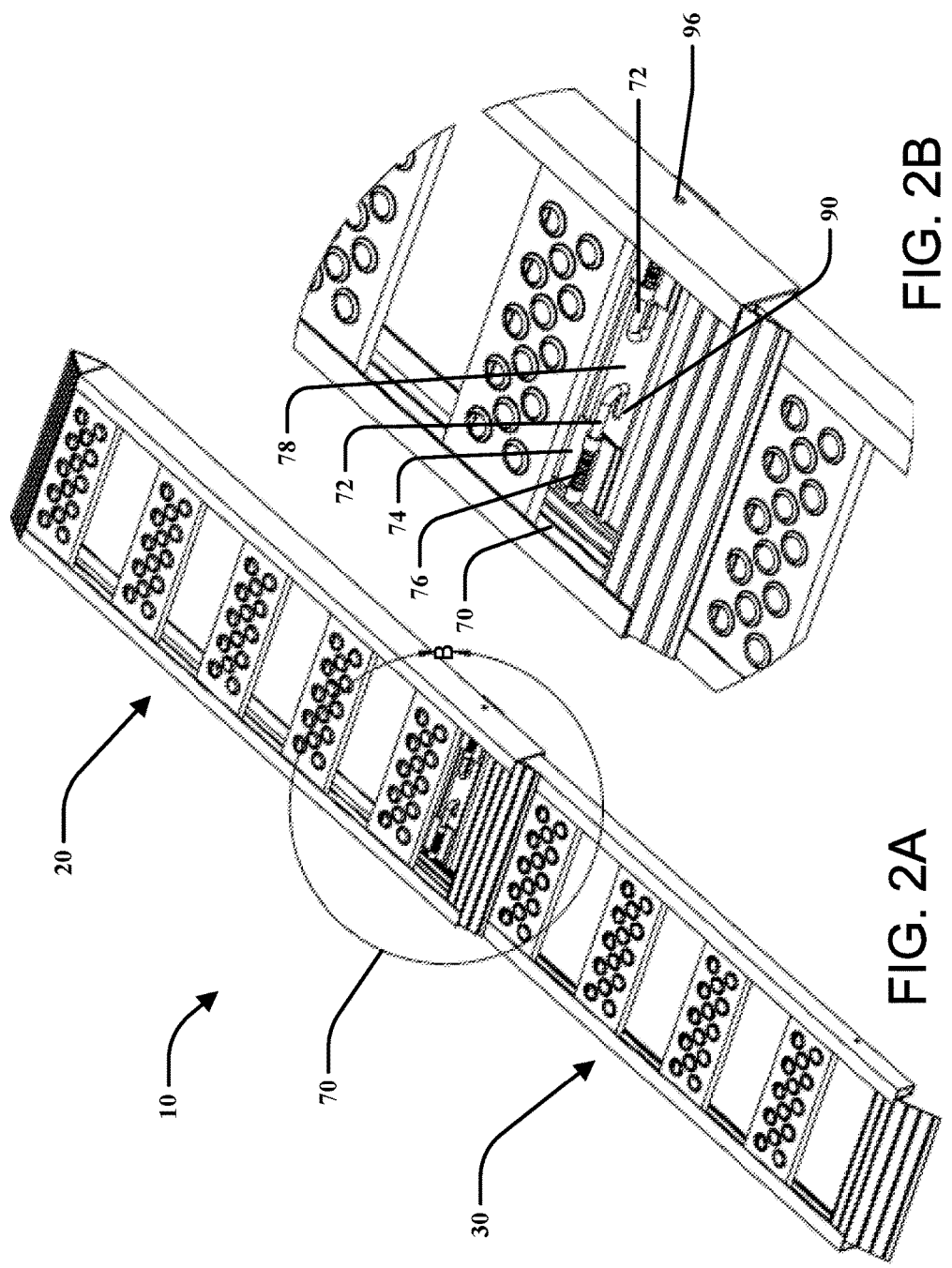

TELESCOPING RAMP

CROSS REFERENCE TO RELATED APPLICATIONS

This application claims priority to U.S. Patent Application No. 62/414,946, filed on Oct. 31, 2016, and entitled "TELESCOPING RAMP," which is hereby incorporated by reference in its entirety.

FIELD OF THE INVENTION

The present invention is generally related to a ramp and, more particularly, to a telescoping ramp with a locking pin system for a vehicle.

BACKGROUND

Many transport vehicles are designed to transport freight, goods, merchandise, personal property, and other such cargo. Often, such transport vehicles utilize a load bed to haul such cargo. For example, operators often utilize the load bed of a pick-up truck to haul cargo. The load bed, however, is often elevated from the ground making it difficult to load and unload heavy objects from such load beds. Accordingly, operators will utilize a ramp that extends from the ground upwards to the load bed of the transporting vehicle to load and unload heavy objects.

Numerous types of ramps are used to assist in the loading and unloading of objects to and from transport vehicles. Particularly, trucks, vans, trailers and the like may utilize ramps to assist in the loading of rolling objects such as ATVs, motorcycles, lawnmowers, etc. One common type of ramp consists of a plurality of rungs whereby each rung is separated from a successive rung by an open space. The rungs may be connected at or near the ends by rails. The successive rungs and the rails form a series of frame-like structures surrounding the central openings, similar to a ladder. Such a structure allows for loading and unloading of objects, such as ATVs, motorcycles, lawnmowers, etc. to and from the transport vehicle.

Because ramps extend often extend from a tailgate of a vehicle to the ground, they need to be of a significant length. This can make storing the ramp difficult as they are long (often five feet or more). Further still, this length can make transporting them difficult as well. In response, ramps that are able to have their length shortened for transport or storing have been developed. This may include folding or telescoping ramps.

Telescoping ramps have also been used to assist with positioning the ramp between the ground and the vehicle. However, known prior art telescoping ramps may be unable to be easily extended or retracted into desired positions. Various other design issues exist in the prior art. In one example, U.S. Pat. No. 7,827,641 to Hoffman et al. discloses a telescoping ramp assembly for spanning two surfaces. This assembly includes stop members used to prevent the sliding ramp members from sliding apart. However, the stop members are not able to prevent movement between the two ramp sections and are susceptible to collapse when heavier objects are placed on the ramp in the extended state. Therefore, there is a need for an improved telescoping ramp that solves the shortcomings of the prior art.

SUMMARY

Disclosed are embodiments of a telescoping ramp is shown and described. The telescoping ramp may include a first ramp section having a pair of rails and a second ramp section having a pair of rails wherein the second ramp section may be received within the first ramps section and be translated between an extended position and a retracted position relative to the first ramp section. A locking mechanism may extend between the pair of rails of the first ramp section. The locking mechanism includes a pair of locking pins. The pair of locking pins may each include an elongated portion and a handle portion that extends from the elongated portion. The pair of locking pins may allow the ramp to be locked in a fully extended and fully retracted position as well as other intermediate positions therebetween.

The pair of locking pins may be spring loaded wherein each locking pin includes a biasing member that provides a bias force to position the locking pins in a locked position. The locking pins may be attached to a mounting plate, the mounting plate may be attached to a base plate, and the base plate may be attached to the rails of the first ramp section. The locking pins may be positioned inwardly from the rails of the first ramp section. The locking pins may be translatable through an aperture that extends through the rails of the second ramp section and engageable with the rails of the first ramp section. The base plate may be positioned along a bottom portion of the first ramp section and may be spaced from a plurality of rungs positioned along a top portion. The handle portion may extend from the elongated portion through an aperture within a base plate. The handle portion may extend downwardly to allow a user to manipulate the locking pin and translate the elongated portion away from engagement with the rail wherein the first rail portion and the second rail portion may be translatable relative to one another. The pair of locking pins may be aligned with one another along a common axis and a user may manipulate the handle portions with one hand to disengage the locking mechanism while using the other hand to translate the first ramp section relative to the second ramp section.

In another embodiment, provided is a telescoping ramp that includes a first ramp section having a pair of rails and a second ramp section having a pair of rails wherein the second ramp section may be received within the first ramp section and be translated between an extended position and a retracted position relative to the first ramp section. A locking mechanism may extend between the pair of rails of the first ramp section and the locking mechanism may include a pair of locking pins. The pair of locking pins may be aligned with one another along a common axis wherein a user may manipulate the handle portions with one hand to disengage the pair of locking pins of the locking mechanism.

The pair of locking pins may each include an elongated portion and a handle portion that extends from the elongated portion. The pair of locking pins may allow the ramp to be locked in a fully extended and fully retracted position as well as other intermediate positions therebetween. The pair of locking pins may be spring loaded wherein each locking pin includes a biasing member that provides a bias force to position the locking pins in a locked position. The locking pins may be attached to a mounting plate, the mounting plate may be attached to a base plate, and the base plate may be attached to the rails of the first ramp section. The locking pins may be positioned inwardly from the rails of the first ramp section and the second ramp section. The locking pins may be translatable through an aperture that extends through the rails of the second ramp section and engageable with the rails of the first ramp section. The handle portion may extend from the elongated portion through an aperture within a base plate and may extend downwardly to allow a user to manipulate the locking pin and translate the elongated portion away from engagement with the rail wherein the first rail portion and the second rail portion are translatable relative to one another.

BRIEF DESCRIPTION OF THE DRAWINGS

Operation of the present teachings may be better understood by reference to the following detailed description taken in connection with the following illustrations, wherein:

FIG. 2A is a top side perspective view of an embodiment of the telescoping ramp in the extended position;

FIG. 2B is an enlarged view of a locking mechanism of the telescoping ramp of FIG. 2A;

DETAILED DESCRIPTION

Figure 1:
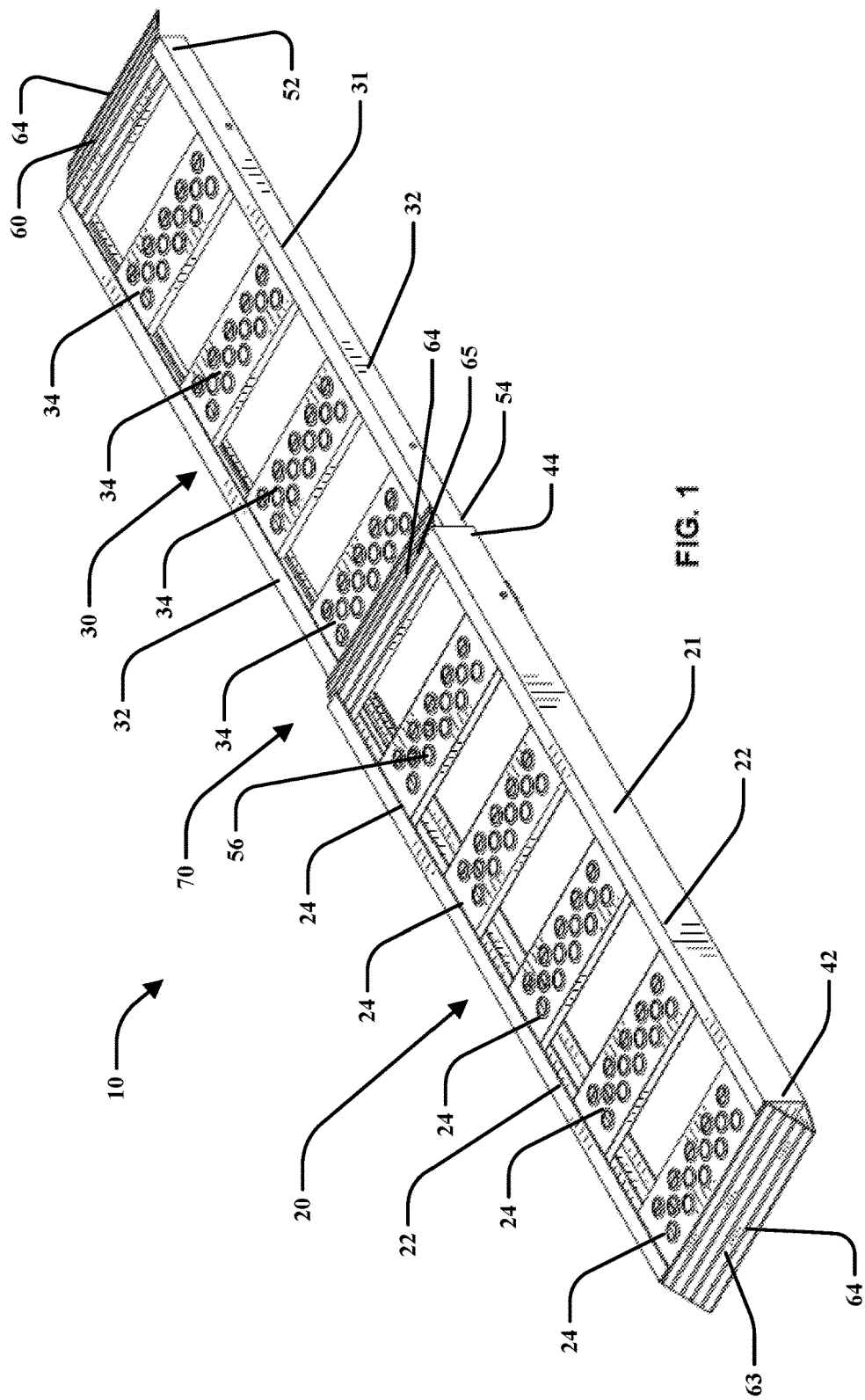
FIG. 1 is a perspective view of an embodiment of a telescoping ramp in an extended position.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As used herein, a towing vehicle may include various types of automobiles (e.g., car, truck, recreational vehicle ("RV"), etc.). A towed vehicle may include trailers (e.g., agricultural trails, boat trailers, etc.), an automobile, or the like. It is noted that various combinations of towed vehicles and towing vehicles may utilize some or all aspects of this disclosure.

An embodiment of a telescoping ramp 10 is illustrated in FIGS. 1-6B. The telescoping ramp 10 may include a first ramp section 20 and a second ramp section 30 such that the first and second ramp sections 20, 30 may be translated between an extended position and a retracted position. It should be understood, however, that while first and second ramp sections 20, 30 are depicted, the telescoping ramp 10 may include any number of sections, e.g., three, four, five, etc. For the sake of brevity, only a two-section ramp will be disclosed. These teachings, however, may be applied to a ramp with more than two sections. The first ramp section 20 may be an outer ramp section having a frame 21 defined by a pair of rails 22 and a plurality of rungs 24 that extend between the rails 22. The second ramp section 30 may be an inner ramp section that is received within the outer ramp section. The inner ramp section 30 may include a frame 31 defined by a pair of rails 32 and a plurality of rungs 34 that extend between the rails 32. However, it is contemplated that the frames 21 and 31 may include a continuous ramp surface in lieu of the plurality of spaced surfaces defined by the rungs 24, 34 and this disclosure is not limited in this regard.

The first ramp section 20 may include first and second ends 42, 44. The second ramp section 20 may include first and second ends 52, 54. The telescoping ramp 10 may be configured to span from a transport vehicle (not shown) or loading surface to and from a second surface (not shown), such as the ground. By way of a non-limiting example, the first end 42 of the first ramp section 20 may engage the ground and the first end 52 of the second ramp section 30 may engage a load bed (not shown) of the transport vehicle. The second end 54 of the second ramp section 30 may be slidingly received within the second end 44 of the first ramp section 20. It should be understood, however, the first end 42 may engage the loading surface and the first end 52 may engage the ground. For example, the telescoping ramp 10 may engage the load bed of a vehicle and extend towards the ground at an angle between 0 and 90 degrees below the surface of the transport vehicle. In particular the angel may be between 15 to 75 degrees and more particularly may be between about 25 to 45 degrees. Similarly, the telescoping ramp 10 may engage the ground and extend towards the load bed of a vehicle at an angle between 0 and 90 degrees above the ground. In particular the angle may be between 15 to 75 degrees and more particularly may be between about 25 to 45 degrees. In one embodiment, the ground angle may be the same and the load bed angle and be about 45 degrees or less.

The telescoping ramp 10 may be of any appropriate shape, size, type or configuration, whereby it may extend at an appropriate angle between the transport vehicle or loading surface, and specifically the load bed thereof, and the second surface such as the ground. By way of a non-limiting example, the ramp 10 may extend from a rear portion of the load bed of the transport vehicle to the ground at an appropriate angle, such as by way of a non-limiting example between 9 and 28 degrees relative to the ground. Although, the present teachings are not limited to these angles. The teachings contemplate any appropriate angle of inclination.

The adjustable length of the telescoping ramp 10 may be selected for the type of transport vehicle and the desired slope for loading and unloading. By way of a non-limiting example, if the transport vehicle is a typical trailer a length of about six feet may provide a desirable slope, and if the transport vehicle is a light pickup truck a length of about eight feet may provide a desirable slope. The present teachings, however, are not limited to any particular length and the telescoping ramp 10 may be of any appropriate length.

Figure 6A:
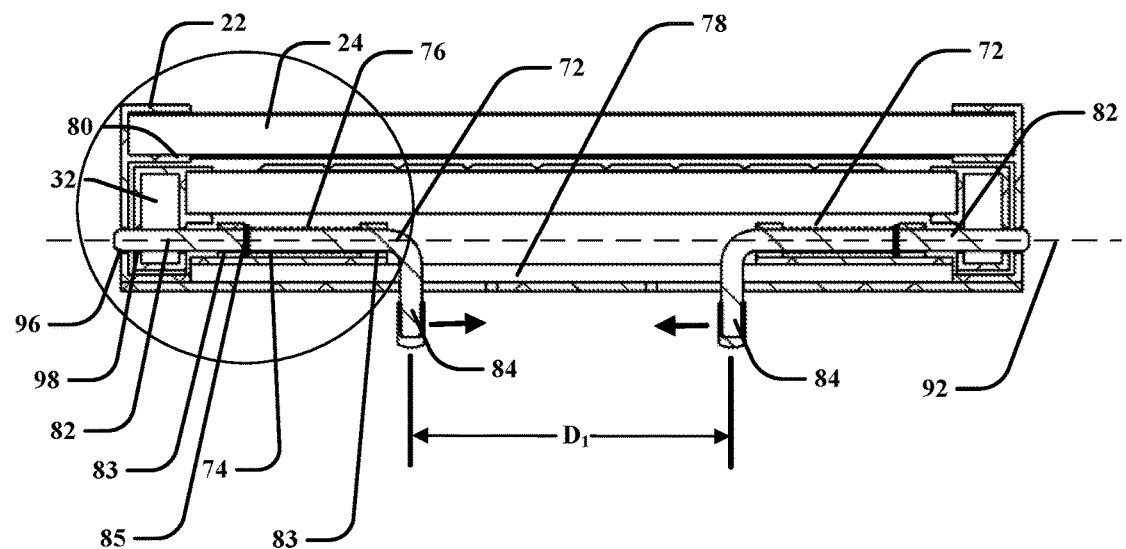
FIG. 6A is a cross-sectional view of the telescoping ramp of FIG. 4 along line B-B.
Figure 6B:
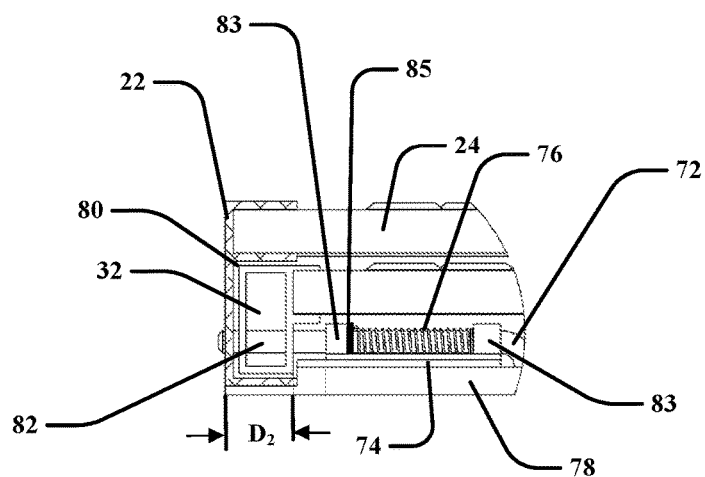
FIG. 6B is a detailed view of a portion of the telescoping ramp along circular D of FIG. 6A.

The first ramp section 20 may include pair of rails 22 that each defines a channel 80 therein to slidingly receive the rails 32 of the second ramp section 30. It should be understood, however, that this configuration may be reversed. In embodiments shown in FIGS. 1-5, the rails 22, 32 of each ramp section 20, 30 may be laterally disposed from each other at an appropriate distance. In one non-limiting example, the width of the first ramp section 20 from outside of rail 22 to outside of rail 22 may be about 13 inches. However, this width may be greater than or even less than this dimension. The present teachings, however, are not limited to the two rails shown. Any appropriate number of rails may be used. The rails 22, 32 may be of any appropriate cross-sectional shape, including, without limitation, boxed, I-beam or the like—an example of which can be seen in detail in FIGS. 6A and 6B. FIGS. 6A and 6B illustrate the outer rail 22 and inner rail 32 in cross section as they are positioned within one another and in particular as the inner rail 32 is positioned within the channel 80 defined by the outer rail 22.

The telescoping ramp 10 may include a ramp surface that may be made of a plurality of rungs 24, 34 of any appropriate configuration. The rungs 24, 34 may be monolithically formed with the respective rails 22, 32 or may be welded, fastened or otherwise attached thereto. The plurality of rungs 24, 34 may be configured such that loads may be pushed or pulled up or down the telescoping ramp 10, as applicable. By way of a non-limiting example, the loads may be manually pushed up or down the rungs 24, 34 or a winch may be utilized for such.

The ramp surface having a plurality of rungs 24, 34 may each include a plurality of apertures 56 spaced apart from one another. As shown in FIG. 1, the plurality of the apertures 56 may be generally aligned in various rows along the rungs 24, 34. The present teachings, however, are not limited to this configuration—any appropriate configuration may be used. Any number of aligned rows may be used. Further, still, the apertures 56 may be positioned in any pattern or no pattern, i.e., randomly positioned, on the ramp surface. The spacing of the apertures 56 on the ramp surface may be selected such that it is substantially less than the width of a wheel or the like of any item that may be loaded or unloaded on the ramp 10 such that the apertures may not impede the progress of the load thereon.

Figure 3A:
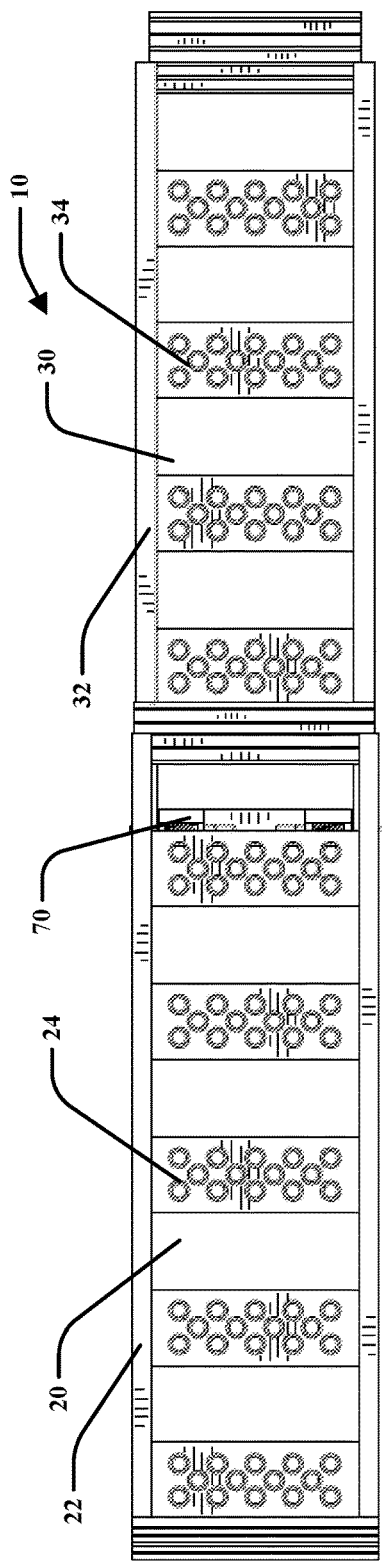
FIG. 3A is a top view of the telescoping ramp in the extended position.
Figure 3B:
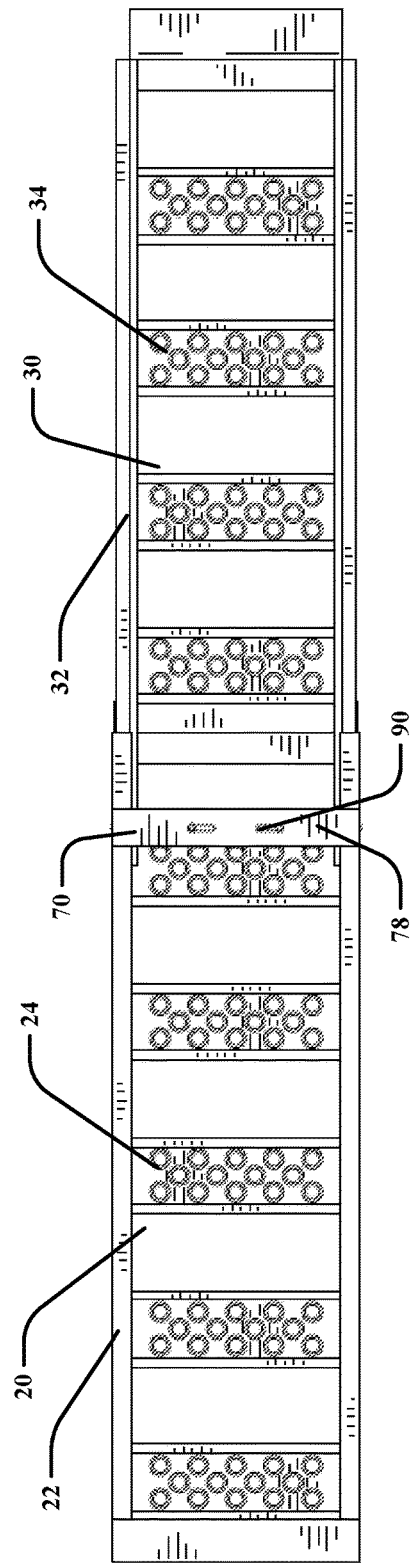
FIG. 3B is a bottom view of the telescoping ramp in the extended position.
Figure 4:
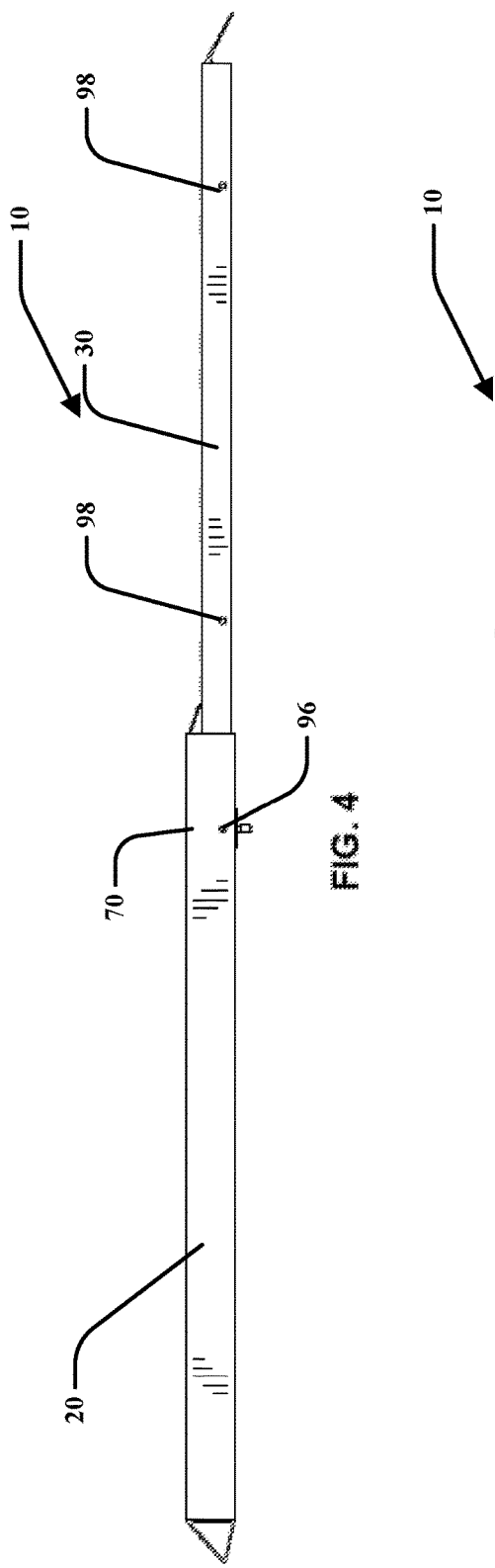
FIG. 4 is a side view of the telescoping ramp in the extended position.
Figure 5:
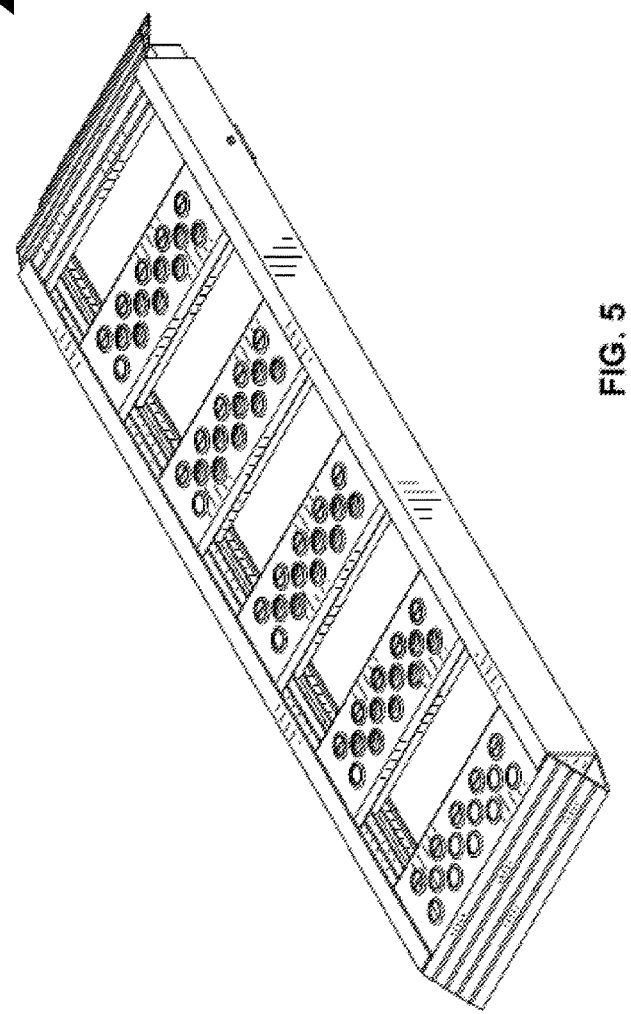
FIG. 5 is a perspective view of the telescoping ramp in a retracted position.

The apertures 56 may be of any appropriate configuration. By way of a non-limiting example, the apertures 56 may be generally oval in shape. The present teachings, however, are not limited to this configuration. As shown in FIGS. 1 and 3, the apertures 56 may extend through the entire rung or ramp surface The apertures 56 may reduce the amount of material utilized with the ramp 10, which may reduce the overall weight of the ramp 10. Further, the apertures 56 may provide additional traction between the item being pushed or pulled up or down the ramp 20 and the ramp surface 50. By way of a non-limiting example, a portion of the aperture 56 may extend above the ramp surface, which may provide the traction surface. The apertures 56 may be formed with the ramp 10. For example, the apertures 56 may be monolithically formed with the ramp surface. In addition or alternatively, the apertures 56 or a portion thereof may be formed such as through a stamping process. This may leave a portion of the material around the aperture 56 sticking up slightly, which may create the traction surface from the rungs 24, 34.

The ramp 10 may further include at least one transition plate 60 that may be attached to the first end 52 of the second ramp section 30 or the first end 42 of the first ramp section 20. In one embodiment, the transition plate 60 may be monolithically formed with the first end 52 of the second ramp section 30 to engage the load bed of the transport vehicle. In addition, the ramp 10 may include a second transition plate 63 attached with the first end 42 of the first ramp section 20 that may engage the ground. The second transition plate 63 may be different from the first transition plate 60 in that the second transition plate 63 may be a tube formed with a ramp surface for structural stability to maintain the second transition plate 63 in an angled orientation relative to the ground, e.g., in a predetermined angled orientation thereto. Additionally, the ramp 10 may include only the second transition plate 63 at the first end 42 of the first ramp section 20 that may engage the ground—the present teachings are not limited to the configuration shown. The first transition plate 60 and second transition plate 63 may be welded or otherwise attached with the rungs 24, 34, the rails 22, 32, or both.

While the transition plates 60, 63 may be of substantially similar construction, they are not limited to such. Only one of the transition plates 60 will be described in detail below, except as otherwise noted. The transition plate 60 may be shaped to provide clearance underneath the ramp 10 to engage the loading surface (e.g., the load bed of the transport vehicle) and the second transition plate 63 may be shaped to provide a transition surface between the second surface (e.g., the ground) and the ramp surface and rungs. The transition plate 60 may include a top surface 64, which may provide a substantially continuous surface for a rolling load, i.e., the transition plate 60 or more specifically the top surface 64 may provide a transition surface between the rungs 24, 34 and applicable loading surface. The general shape on the top surface 64 may make the transition from the ramp 10 to the load bed of the transport vehicle more continuous such that the load may roll over such with less effort. For example, the shape of the top surface 64 may create a generally continuous surface from the ramp 10 to the tailgate or load bed of the vehicle.

The ramp 10 components may be formed from metal, alloy or rigid polymer and in one embodiment is made from extruded aluminum material. In particular, the rails 22, 32 and rungs 24, 34 may be made with extruded aluminum that are welded together to define their respective frames. Any appropriate amount of material, such as by way of a non-limiting example, aluminum, steel, plastic or the like may be extruded to any appropriate shape. Moreover, the apertures 56 may be formed through the extrusion process or may be formed through a subsequent operation, such as by way of a non-limiting example, punching or drilling the apertures. The ramp 10 being formed from aluminum does result in the ramp 10 being lighter than use of other rigid materials, while also retaining the appropriate strength to operatively handle the loads applied during operation of the ramp 10.

Further, in some embodiments, the transition plates 60, 63 may be formed with the appropriate bend and may not need to be bent during a subsequent operation. Still further, the order of the steps of forming the ramp 10 may be performed in any appropriate order—the present teachings are not limited to the order described. Still further, steps may be skipped and additional steps may be added.

An intermediate transition plate 65 may be positioned between the first ramp section 20 and the second ramp section 30. The intermediate transition plate 65 may be angled to allow a smooth transition from the first ramp section 20 to the second ramp section 30. The intermediate transition plate 65 may be attached to the second end 44 of the first ramp section 20 and include a top surface 64 as described above. For example, the intermediate transition plate 65 may provide a generally continuous surface to make it easier for an object (such as a motorcycle, ATV, lawn mower, snowmobile, etc.) to be pushed up or down the ramp 10. The continuous surface of the transition plate 65 may allow the wheels of an object (or any component thereof) to easily pass over. The operator does not need to exert any additional effort to pass over the transition plate 65.

In some embodiments, the top surface 64 of the transition plates 60, 63, 65 may include a textured finish. The textured finish may provide traction between the item being pushed or pulled up or down the ramp 10. By way of a non-limiting example, the traction finish may be at least one of a knurled surface and a textured strip of material that may be adhered to the ramp surface. Further still, the textured finish may include a diamond pattern finish, raised or depressed bumps, raised or depressed ridges, or any combination of such. The textured surface may provide a suitable surface to generally prevent slippage during loading and unloading of the ramp 10. The present teachings are not limited to the configuration of the textured surface shown or otherwise described herein. Any appropriate textured surface may be utilized without departing from the present teachings.

The telescoping ramp may include a locking mechanism 70 as illustrated by FIGS. 2A, 2B, 6A, 6B, and 6C. The locking mechanism 70 may allow the ramp 10 to be locked in a fully extended or fully retracted position as well as other intermediate positions therebetween. The locking mechanism 70 may include a pair of spring loaded locking pins 72. Each locking pin 72 may be mounted to a mounting plate 74 and include a biasing member 76. The mounting plate 74 may be attached to a base plate 78. The base plate 78 may extend between the rails 22 of the first ramp section 20 adjacent the second end 44. The locking pins 72 may be positioned inwardly from the rails 22, 32 as the second ramp section 30 is attached to the first ramp section 20 and be in general perpendicular alignment with the rails 22, 32 of the first and second ramp sections 20, 30. However, the locking pins 72 may also be positioned in various geometrical configurations relative to the rails 22, 32 and this disclosure is not limited. The locking pins 72 may be translatable through an aperture 98 that extends through the rails 32 of the second ramp section 30 and an aperture or recess 96 along the rails 32 of the first ramp section 20. (See FIG. 4) There may be a plurality of apertures 98 through the rails 32 (i.e., there are apertures 98 on each side of the rails 32) of the second ramp section 30 wherein the length of the telescoping ramp 10 may be adjusted based on the location of the apertures 98 of the second ramp section 30. The apertures 98 may be positioned along the rails 32 of the second ramp section 30 at any appropriate position. Further, any number of apertures 98 may be utilized without departing from the present teachings, which are not limited to the number shown. The number of apertures 98 included may correspond with the number of locations that the ramp 10 can telescope. By way of a non-limiting example, if four apertures 98 are included on each of the rails 32, the ramp 10 may be selectively positionable in four predetermined locations. This results in the ramp 10 being telescopingly positionable to four different lengths which may also allow a user to modify the ground angle and the bed angle of the telescoping ramp 10 as desired.

The mounting plate 74 may include a pair of latch barrels 83 to engage the biasing member 76 and locking pin 72. The biasing member 76 may be configured to maintain the locking pin 72 in the locked position wherein an elongated portion 82 of the locking pin 72 may extend through the rails 22, 32. The biasing member 76, latch barrels 83 and a roll pin 85 may maintain the locking pin 72 in place while the bias force is being applied against the locking pin 72 towards the locked position. The roll pin 85 may be positioned on the elongated portion 82 of the locking pin 72 and abut between the latch barrel 83 and biasing member 76. In one embodiment, the roll pin 85 engages the biasing member 76 to the elongated portion 82 of the locking pin 72 to allow the bias force to be applied thereto. Further, the roll pin 85 may be positioned against the latch barrel 83 adjacent to the rails 22, 32 to prevent further movement when the locking pin 72 is in the locked position. By way of non-limiting example, the roll pin 85 may be a retaining ring, cotter pin or may be a shoulder portion with an increased diameter relative to the remaining portion of the of locking pin 72.

A handle portion 84 of the locking pins 72 may extend from the elongated portion 82. The handle portion 84 may extend through an aperture 90 (See FIG. 3B) within the base plate 78. Notably, there may be a single aperture 90 within the base plate 78 that allows the handle portions 84 of both locking pins 72 (see FIG. 6A) or there may be a pair of apertures 90, one for each handle portion 84 of the locking pins 72 (see FIG. 3B). The handle portions 84 may extend downwardly to allow a user to manipulate the locking pins 72 and translate the elongated portions 82 away from engagement with the rails 22, 32 to allow the first rail portion 20 and the second rail portion 30 to be translated relative to one another.

The pair of locking pins 72 may be aligned with one another along a common axis 92. However, the pair of locking pins 72 may also be generally offset from one another as well. As such, a user may manipulate the handle portions 84 to translate both elongated portions 82 of the locking pins 72 away from engagement with both of the rails 22, 32 generally at the same time. This operation may be accomplished with one hand of the user while the other hand is used to support or translate the first ramp section 20 relative to the second ramp section 30. The handle portions 84 may be squeezed towards one another as illustrated by FIG. 6A against the bias force provided by the biasing member 76 to disengage both locking pins 72 from the rails 22, 32 along each side of the ramp 10. Notably, the elongated portions 82 of the locking pins 72 may not be exactly aligned along the common axis 92 as there may be some tolerance. The position of the locking pins 72 may be configured such that the handle portions 84 of the locking pins 72 may be in close proximity towards one another to allow a user to simultaneously grasp the handle portions 84 of each locking pin 72 with a single hand and translate the locking pins 72 away from engagement with both of the rails 22, 23.

In one non-limiting example, the first in the locked position, the handle portions 84 of the locking pins 72 may include a dimension $D_1$ (see FIGS. 6A and 6C) that is about 6 inches from one another. However, this dimension may be about 5 inches or even about 3 inches or any dimension from 2.5 to 6 inches that is ergonomic for the grip of a human hand. In a particular embodiment, $D_1$ is about 3 inches or even about 4.6 inches. While in the unlocked position, the handle portions 84 may be translated towards one another such that they are in close proximity, in abutment, or may partially extend passed one another and this disclosure is not limited in this regard. This particular configuration may be used with telescoping ramps 10 of various lengths and widths. In one embodiment, as illustrated by FIG. 6B, the rail dimension $D_2$ identifies the width of the rails 22, 32 and may be the amount of translation used to place the locking pins 72 from the locked position to the unlocked position. In one non-limiting example, the rail dimension $D_2$ may be about 1 inch or any dimension between about ½ inch to about 3 inches that would practically allow for the ergonomic grip of a human hand to translate both pins. In one embodiment, both pins may be translated by a singled hand at the same time to translate the pins from the locked position to the unlocked position.

Figure 6C:
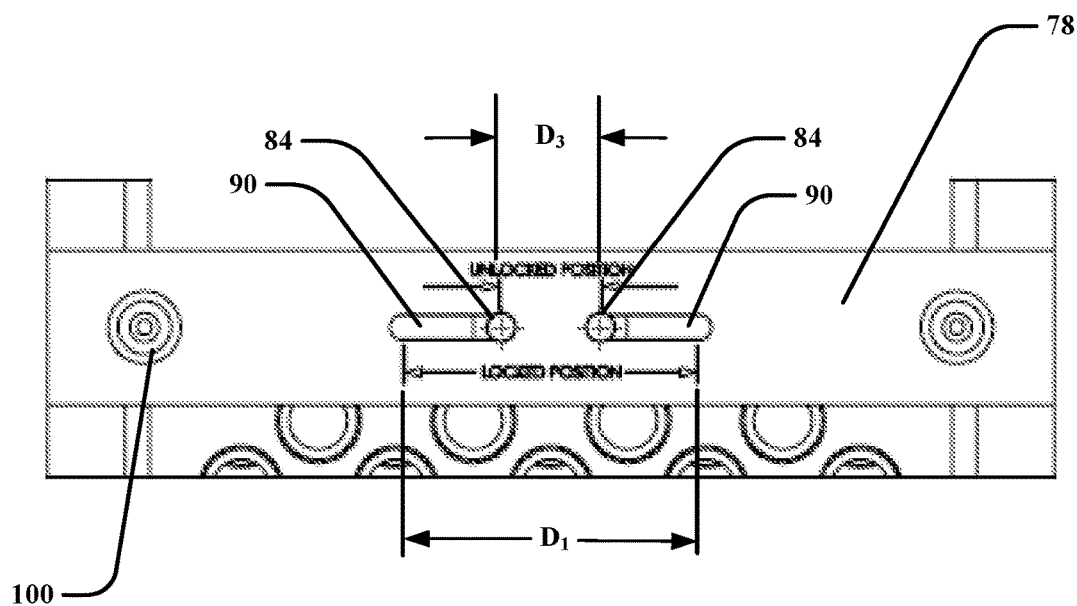
FIG. 6C is a detailed view of a portion of the base plate of the telescoping ramp of FIG. 6A.
Figure 6D:
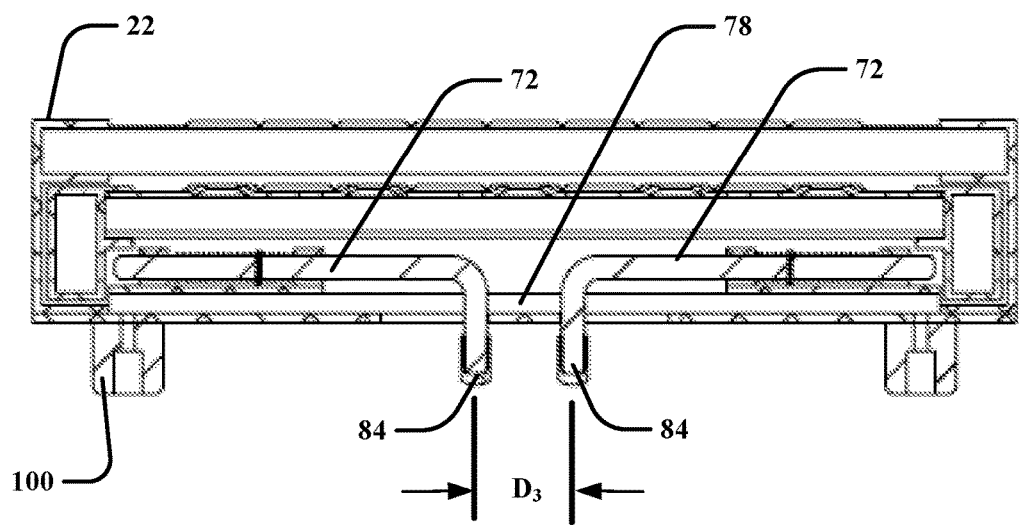
FIG. 6D is a cross-sectional view of the base plate of the telescoping ramp in an unlocked position.

FIGS. 6C and 6D illustrate views of the base plate 78 with apertures 90 in which handle portions 84 of the locking pins 72 extend therethrough in an unlocked position. Here, the first and second ramp sections 20, 30 may be translated between the extended position, the retracted position, and intermediate positions. The base plate 78 includes markings identifying the position of the locking pins 72 in both the "unlocked position" and the "locked position." In the locked position, the handle portions 84 are aligned with the markings at dimension $D_1$ while in the unlocked position, the handle portions 84 are aligned with the markings at dimension $D_3$. Dimension $D_3$ may be about 0.5 inch to about 4 inches and in one non-limiting example, may be about 1.2 inches to about 2.5 inches. Further, D3 may be about 1.29 inches. Additionally, that protrusions 100 may be positioned adjacent the handle portions 84 to provide protection or support during storage, the protrusions 100 may be aligned along the base plate 78 and in general alignment with the locking pins to assist with preventing damage to the pins when the ramp 10 is not in use. The protrusions 100 may be a bumper and may extend further from the base plate than the handle portions 84.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

The invention claimed is:

1. A telescoping ramp comprising:
a first ramp section having a pair of rails;
a second ramp section having a pair of rails, the second ramp section is received within the first ramp section and is translated between an extended position and a retracted position relative to the first ramp section; and
a locking mechanism extending between at least one of the pairs of rails of the first and second ramp sections, the locking mechanism including a pair of locking pins selectively engageable with the first and second ramp sections, the pair of locking pins having handle portions disposed between the at least one of the pairs of rails, an axial movement of the handle portions along a common axis of the pair of locking pins locking the second ramp section relative to the first ramp section.

2. The telescoping ramp of claim 1, wherein the pair of locking pins each include an elongated portion and a handle portion that extends from the elongated portion.

3. The telescoping ramp of claim 1, wherein the pair of locking pins allow the first and second ramp sections to be locked in a fully extended position relative to each other, a fully retracted position relative to each other and at least one intermediate position between the fully retracted and extended positions.

4. The telescoping ramp of claim 1, wherein each of the pair locking pins includes a biasing member the provides a bias force to position the locking pins in a locked position engaging the first and second ramp sections.

5. The telescoping ramp of claim 1, wherein the locking pins are attached to a mounting plate, the mounting plate is attached to a base plate, and the base plate is attached to the rails of the first ramp section.

6. The telescoping ramp of claim 4, wherein the locking pins are positioned inwardly from the rails of the first ramp section.

7. The telescoping ramp of claim 4, wherein the locking pins are translatable through an aperture that extends through the rails of the second ramp section and engageable with the rails of the first ramp section.

8. The telescoping ramp of claim 5, wherein the base plate is positioned along a bottom portion of the first ramp section and is spaced from a plurality of rungs positioned along a top portion.

9. The telescoping ramp of claim 2, wherein the handle portion extends from the elongated portion through an aperture within a base plate.

10. The telescoping ramp of claim 9, wherein the handle portion extends downwardly to allow a user to manipulate the locking pin and translate the elongated portion away from engagement with the rail wherein the first rail portion and the second rail portion are translatable relative to one another.

11. The telescoping ramp of claim 1 wherein the pair of locking pins are aligned with one another along the common axis.

12. The telescoping ramp of claim 1, wherein the pair of locking pins allow the ramp to be locked in a fully extended and fully retracted position as well as other intermediate positions therebetween.

13. A telescoping ramp comprising:
a first ramp section having a pair of rails;
a second ramp section having a pair of rails wherein the second ramp section is received within the first ramp section and is translatable between an extended position and a retracted position relative to the first ramp section; and
a locking mechanism extending between at least one of the pairs of rails of the first and second ramp sections, the locking mechanism including a pair of locking pins, the pair of locking pins having handle portions disposed between the at least one of the pairs of rails of the first and second ramp sections;
wherein the pair of locking pins are aligned with one another along a common axis allowing a user to manipulate an axial movement of the handle portions along the common axis with one hand to disengage the pair of locking pins of the locking mechanism.

14. The telescoping ramp of claim 13, wherein the pair of locking pins each include an elongated portion and a handle portion that extends from the elongated portion.

15. The telescoping ramp of claim 13, wherein the pair of locking pins allow the ramp to be locked in a fully extended and fully retracted position as well as other intermediate positions therebetween.

16. The telescoping ramp of claim 13, wherein in the pair of locking pins each include the handle portions and the locking pins are translatable between a locked position and an unlocked position.

17. The telescoping ramp of claim 16, wherein as the locking mechanism is in the locked position, the handle portions of the locking pins are spaced from one another less than about 6 inches.

18. The telescoping ramp of claim 17, wherein as the locking mechanism is in the unlocked position, the handle portions of the locking pins are spaced from one another between about 1 inch to about 4 inches.

19. The telescoping ramp of claim 17, wherein the locking pins are translatable through an aperture that extends through the rails of the second ramp section and engageable with the rails of the first ramp section.

20. The telescoping ramp of claim 14 wherein the handle portion extends from the elongated portion through an aperture within a base plate.

21. The telescoping ramp of claim 9, wherein the handle portion extends downwardly to allow a user to manipulate the locking pin and translate the elongated portion away from engagement with the rail wherein the first rail portion and the second rail portion are translatable relative to one another.

\* \* \* \* \*